Patented Sept. 11, 1934

1,973,168

UNITED STATES PATENT OFFICE 1,973,168

METHOD OF TREATING SEWAGE

Clark T. Henderson, Burlingame, and Clyde C. Kennedy, Los Gatos, Calif.

No Drawing. Application December 3, 1930, Serial No. 499,849

12 Claims. (Cl. 210—2)

This invention relates to a method of treating industrial waste water and sewage.

The primary object of the invention is the provision of a method for the sterilization of water and sewage which is highly efficient, and economical, and which is particularly adapted to be used in connection with sterilization on a large scale as for municipal water plants, sewage disposal plants, and similar enterprises.

Another object of the invention is the provision of a method for sterilizing sewage or the like, in such a manner as to destroy only those bacteria which are productive of putrefactive digestion; our method does not destroy nitrifying bacteria, which do not cause putrefaction.

A further object of the invention is to provide a method for sterilizing sewage so as to utilize the ammonia salts present in the sewage, by converting the said salts into ammonium hydroxides, which in turn are capable to react with hypochlorite, or hypochlorous acid subsequently added to the sewage; in the event a predetermined quantity of hypochlorite or hypochlorous acid is to be used, the ammonium hydroxide content of the sewage is to be corrected to provide an optimum ratio between the total quantity of ammonia present as ammonium hydroxide, and the available chlorine, so as to form the desired quantity of chloramine, by which the sewage is sterilized to the required extent.

The use of chlorine as such for the sterilization of sewage has not met with great success for several reasons. Chief among these are: (a) the large quantities required; (b) chlorine used in sufficient quantities for sterilization destroys not only those bacteria which are productive of putrefactive digestion but also the nitrifying bacteria which do not cause putrefaction and consequent odor nuisance, but rather aid in the liquefaction and disposal. For this reason sewage which has been chlorinated sufficiently to accomplish any degree of sterilization is not amenable to disposal in activated sludge plants, Imhoff tanks, and the like.

We have observed that chloramine ($NH_2Cl$) which has a higher Ridal and Walker coefficient than chlorine (ratio approx. 3:1) is more efficient in the presence of organic matter than chlorine even though the latter be applied in Ridal and Walker equivalent quantities. The reason for this is that chlorine is so active that it combines with any and all organic substances with which it may come in contact, whereas chloramine does not react with these substances so actively but by reason of its nitrogenous nature is absorbed by bacteria of the non-nitrifying type, while nitrifying bacteria are seemingly not effected by dosages which would kill non-nitrifying or putrefying organisms.

Chloramine can be formed by reaction between ammonium hydroxide and a hypochlorite as

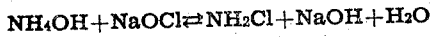
$$NH_4OH + NaOCl \rightleftarrows NH_2Cl + NaOH + H_2O$$

The use of the hypochlorite of any base has the effect of producing a mol. of hydroxide of the base for each mol of chloramine formed. Sewage is sensitive to changes in ph, so far as its subsequent treatment is concerned, therefore we find it preferable to use HOCl which reacts with ammonium hydroxide as follows:

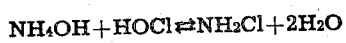
$$NH_4OH + HOCl \rightleftarrows NH_2Cl + 2H_2O$$

Sewage if treated at some distance from the point of origin almost invariably contains ammonia but in some other form rather than as a hydroxide, as for example, ammonium carbonate or ammonium sulphate.

If HOCl is added to sewage containing such salts of ammonia, then the HOCl reacts as follows:

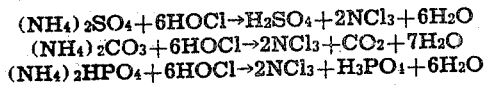

$(NH_4)_2SO_4 + 6HOCl \rightarrow H_2SO_4 + 2NCl_3 + 6H_2O$
$(NH_4)_2CO_3 + 6HOCl \rightarrow 2NCl_3 + CO_2 + 7H_2O$
$(NH_4)_2HPO_4 + 6HOCl \rightarrow 2NCl_3 + H_3PO_4 + 6H_2O$ The nitrogen trichloride so formed is not as persistent as chloramine nor as satisfactory a sterilizing agent in many respects. Also there is acid formed in each case.

We have noted that if raw sewage is first treated with hydrated lime, any salts of ammonia present will be converted into ammonium hydroxide thus:

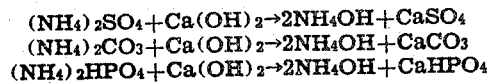

$(NH_4)_2SO_4 + Ca(OH)_2 \rightarrow 2NH_4OH + CaSO_4$
$(NH_4)_2CO_3 + Ca(OH)_2 \rightarrow 2NH_4OH + CaCO_3$
$(NH_4)_2HPO_4 + Ca(OH)_2 \rightarrow 2NH_4OH + CaHPO_4$ From the foregoing it will be seen that in order to treat sewage with chloramine it is necessary that the ammonia present first be converted to ammonium hydroxide then treated with a hypochlorite or preferably hypochlorous acid together with sufficient ammonium hydroxide so that the total quantity of ammonia present as $NH_4OH$ will be approximately ¼ to ½ of the weight of the available chlorine added, but no more than 170/355 of the weight of the available chlorine present.

In the practical carrying out of this invention several series of steps may be followed, but the same principle is employed in all the various embodiments.

The first step of the method is preferably the adding of lime, preferably hydrated lime, to the sewage which reacts with the salts of ammonia present in the sewage and forms from all the ammonium salts, ammonium hydroxide. In addition an inert salt or salts is also formed.

The second step is the addition of a hypochlorite, preferably hypochlorous acid to the sewage, the available chlorine of which reacts with the ammonia present in the form of ammonium hydroxide, and forms chloramine. The resultant chloramine sterilizes the sewage to the desired extent as heretofore set forth.

The amount of hypochlorite or hypochlorous acid added is so determined that the said ratio of approximately ¼ to 170/355 between the weight of available ammonia and the weight of available chlorine is effected.

In the event it is desired to utilize a predetermined amount of chloramine for the sterilization, the steps of the method are as follows:

First hydrated lime is added to the sewage whereby the ammonium salts present in the sewage are converted to ammonium hydroxides. Then sufficient additional ammonium hydroxide is added, so as to provide the total amount of ammonia necessary to react in the aforesaid manner and ratio with the available chlorine of the predetermined quantity of hypochlorate or hypochlorous acid. This additional ammonium hydroxide may be added to the sewage either before the addition of hypochlorite and hypochlorous acid, or it may be added together with the latter.

In some instances it is not necessary to sterilize the sewage continuously. Certain bacteria need a certain period of time, in instances 24 hours, to develop in the sewage. In such instances it is sufficient to sterilize the sewage intermittently within that period to kill the bacteria before the same develops, and thus our method is readily adapted either for economical continuous treatment of sewage, or intermittent, periodical treatment of the sewage.

The quantity of chloramine to be formed, and the necessary quantity of hypochlorite or hypochlorous acid therefor, and the period of time for sterilization is determined in accordance with local conditions.

The hypochlorites or hypochlorous acid may be formed in any suitable and economical manner, such as the passing of chlorine water through crushed lime or the like.

Having thus described this invention, what we claim and desire to secure by Letters Patent is:

1. The process herein set forth of sterilizing water and sewage which consists in first adding lime to the sewage, and then subsequently adding hypochlorite to the sewage.

2. The process herein set forth of sterilizing industrial waste water and sewage which consists in adding lime to the sewage separately, and then subsequently adding hypochlorous acid to the sewage.

3. The process herein set forth of sterilizing industrial waste water and sewage which consists in adding lime to convert all the salts of ammonia present to ammonium hydroxide; and then subsequently adding hypochlorite to react with said ammonium hydroxide.

4. The process herein set forth of sterilizing industrial waste water and sewage which consists in adding lime to convert all the salts of ammonia present to ammonium hydroxide; and then subsequently and separately adding hypochlorous acid to react with said ammonium hydroxide.

5. The process herein set forth of sterilizing industrial waste water and sewage which consists in adding lime to convert the salts of ammonia present to ammonium hydroxide; and then separately adding hypochlorite to react with said ammonium hydroxide, the hypochlorite added being of such quantity that the ratio of the ammonia present as ammonium hydroxide to the available chlorine is approximately from ¼ to 170/355 by weight.

6. The process herein set forth of sterilizing industrial waste water and sewage which consists in adding lime to convert the salts of ammonia present to ammonium hydroxide; and then separately adding hypochlorous acid to react with said ammonium hydroxide, the hypochlorous acid added being of such quantity that the ratio of the ammonia present as ammonium hydroxide to the available chlorine is approximately from ¼ to 177/355 by weight.

7. The process herein set forth of sterilizing industrial waste water and sewage which consists in separately adding hydrated lime, and after the lime converts the salts of ammonia present in the sewage to ammonium hydroxide, separately adding hypochlorite.

8. The process herein set forth of sterilizing industrial waste water and sewage which consists in adding hydrated lime, and after the lime converts the salts of ammonia present in the sewage to an ammonium hydroxide, separately adding hypochlorous acid.

9. The process herein set forth of sterilizing industrial waste water and sewage with a predetermined quantity of chloramine, which consists in adding lime to the water or sewage to form ammonium hydroxide from the salts present in said water or sewage; then separately adding a predetermined quantity of hypochlorite together with ammonium hydroxide in such quantity that the ratio of the total ammonia present as ammonium hydroxide to the available chlorine is approximately from ¼ to 170/355 by weight.

10. The process herein set forth of sterilizing industrial waste water and sewage with a predetermined quantity of chloramine, which consists in adding lime to the water or sewage to form ammonium hydroxide from the salts present in said water or sewage; then adding a predetermined quantity of hypochlorous acid together with ammonium hydroxide in such quantity that the ratio of the total ammonia present as ammonium hydroxide to the available chlorine is approximately from ¼ to 170/355 by weight.

11. The treatment of sewage which comprises the converting of the ammonium salts present in the sewage to ammonium hydroxide, then after the salts are converted adding hypochlorous acid to the sewage.

12. The treatment of sewage which comprises the converting of the ammonium salts present in the sewage to ammonium hydroxide, then adding hypochlorous acid to the sewage, in such quantity that the ratio between the ammonia present as ammonium hydroxide and the available chlorine is approximately from ¼ to 170/355 by weight.

CLARK T. HENDERSON.
CLYDE C. KENNEDY.